(12) United States Patent
Shao et al.

(10) Patent No.: US 12,326,381 B2
(45) Date of Patent: *Jun. 10, 2025

(54) METHODS, SYSTEMS, AND MEDIUMS FOR GAS MONITORING AND ASSESSMENT BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,931

(22) Filed: May 8, 2024

(65) Prior Publication Data

US 2024/0288328 A1  Aug. 29, 2024

Related U.S. Application Data

(63) Continuation of application No. 18/341,732, filed on Jun. 26, 2023, now Pat. No. 12,018,996.

(30) Foreign Application Priority Data

May 24, 2023 (CN) .......................... 202310586674.3

(51) Int. Cl.
G01M 3/04 (2006.01)
(52) U.S. Cl.
CPC .................................... *G01M 3/04* (2013.01)
(58) Field of Classification Search
CPC ........................................................ G01M 3/04
See application file for complete search history.

(56) References Cited

U.S. PATENT DOCUMENTS 11,791,914 B2 * 10/2023 Cella .................. G05B 23/0286
702/188
2018/0365555 A1 12/2018 Aslam
(Continued)

FOREIGN PATENT DOCUMENTS

CA 3138879 A1 11/2020
CN 206249037 U 6/2017
(Continued)

OTHER PUBLICATIONS

Zou, Yixuan, Efficient Monitoring and Emergency Response of Emergent Air Pollution Events in Space of Large Buildings, China Master's Theses Full-text Database, Engineering Science and Technology Series I, 2021, 82 pages.
(Continued)

*Primary Examiner* — Arleen M Vazquez
*Assistant Examiner* — Lynda Dinh
(74) *Attorney, Agent, or Firm* — METIS IP LLC (57) ABSTRACT

A method, system, and medium for gas monitoring and assessment based on Internet of Things. The method is executed by a processor in a smart gas safety management platform of a system for gas monitoring and assessment based on Internet of Things. The method includes: obtaining industrial gas data of a workshop to be monitored based on a smart gas indoor device object platform and uploading the industrial gas data to a smart gas data center through a smart gas indoor device sensor network platform; obtaining regional data of the workshop to be monitored based on a smart gas service platform and uploading the regional data to the smart gas data center through the smart gas indoor device sensor network platform; determining a key sub-region based on the regional data and the industrial gas data.

17 Claims, 5 Drawing Sheets

(56) References Cited

U.S. PATENT DOCUMENTS

| | | | |
|---|---|---|---|
| 2020/0191897 A1 | 6/2020 | Yoon | |
| 2020/0309632 A1* | 10/2020 | Shao | G01D 18/00 |
| 2022/0357234 A1* | 11/2022 | Maslanik | G01N 33/0075 |
| 2023/0129412 A1* | 4/2023 | Roy | G01M 3/04 |
| | | | 702/50 |

FOREIGN PATENT DOCUMENTS

| | | | |
|---|---|---|---|
| CN | 107146385 A | 9/2017 |
| CN | 108647470 A | 10/2018 |
| CN | 109672847 A | 4/2019 |
| CN | 111563433 A | 8/2020 |
| CN | 111949749 A | 11/2020 |
| CN | 212621322 U | 2/2021 |
| CN | 112966374 A | 6/2021 |
| CN | 115330278 A | 11/2022 |
| CN | 115619071 A | 1/2023 |
| CN | 115685861 A | 2/2023 |
| CN | 115751203 A | 3/2023 |
| CN | 116011740 A | 4/2023 |
| CN | 116016856 A | 4/2023 |
| EP | 3655743 A1 | 5/2020 |
| EP | 3745230 A1 | 12/2020 |
| IN | 202011035583 A | 2/2022 |
| JP | 2016025377 A | 2/2016 |
| KR | 100918960 B1 | 9/2009 |

OTHER PUBLICATIONS

Li, Jianhua et al., The Application of Oil and Gas Production IOT Technology in Oil and Gas Production, Automation Panorama, 2013, 4 pages.

Gas Detection Experts, Combustible Gas Alarm Installation Height Specification Standard, Zhihu.com, 2020, 7 pages.

* cited by examiner

METHODS, SYSTEMS, AND MEDIUMS FOR GAS MONITORING AND ASSESSMENT BASED ON INTERNET OF THINGS

CROSS REFERENCE TO RELATED APPLICATIONS

This application is a continuation of U.S. patent application Ser. No. 18/341,732, filed on Jun. 26, 2023, which claims priority of Chinese Patent Application No. 202310586674.3, filed on May 24, 2023, the entire contents of which are incorporated herein by reference.

TECHNICAL FIELD

The present disclosure relates to the field of gas monitoring, and in particular, to a method, system, and medium for gas monitoring and assessment based on Internet of Things.

BACKGROUND

With the popularization of gas usage, gas has been widely integrated into daily production and life. However, there are still certain technical difficulties in monitoring of gas leakage safety in regions such as industrial processing workshops and production plants. According to existing standards and regulations, an installation location of a monitoring device should be determined according to a gas density and wind direction, and avoid installing the monitoring device in a place where the airflow is too large. However, the standards often only give a reasonable range (e.g., a height range of the factory, a distance range between the monitoring device and the ventilation port), and in the actual installation, it is often necessary to be guided by technical personnel with rich installation experience which is time-consuming and labor-intensive. And due to human factors and a complex and volatile environment, the installation parameters may have poor adaptability.

Therefore, it is hoped to provide a method, system, and medium for monitoring smart gas leakage safety based on an Internet of Things system, which can reasonably and reliably determine recommended monitoring sites for different complex environments based on data obtained from an Internet of Things system, and improve the accuracy and efficiency of monitoring of gas leakage safety.

SUMMARY

One or more embodiments of the present disclosure provide a method for gas monitoring and assessment based on Internet of Things, wherein the method is executed by a processor in a smart gas safety management platform of a system for gas monitoring and assessment based on Internet of Things, and the method comprises: obtaining industrial gas data of a workshop to be monitored based on a smart gas indoor device object platform and uploading the industrial gas data to a smart gas data center through a smart gas indoor device sensor network platform; obtaining regional data of the workshop to be monitored based on a smart gas service platform and uploading the regional data to the smart gas data center through the smart gas indoor device sensor network platform; determining a key sub-region based on the regional data and the industrial gas data; determining at least one set of diffusion trend data of the key sub-region based on environmental data of the key sub-region; determining at least one recommended monitoring site based on the at least one set of diffusion trend data of the key sub-region, wherein the at least one recommended monitoring site includes at least one mandatory turn-on site and at least one optional turn-on site; sending the at least one recommended monitoring site to the smart gas user platform through the smart gas indoor device sensor network platform, and integrating and coordinating an interact between the smart gas user platform and a smart supervision service sub-platform to obtain service for safety supervision; constructing a map of recommended monitoring sites based on the at least one recommended monitoring site, the map of recommended monitoring sites being a map that reflects a relationship between various factors in symbolic form based on the at least one recommended monitoring site; and determining a risk value through a risk assessment model based on the map of recommended monitoring sites, wherein the risk assessment model is a graph neural network model, and the risk value is an index configured to judge whether the gas leakage is monitored timely and accurately; wherein the risk assessment model is obtained by training with a training sample and a label separately, the training sample and the label are constructed with historical data of the smart gas data center, the training sample includes at least one map of sample recommended monitoring site constructed based on different sample recommended monitoring sites, the label corresponding to the training sample is whether gas leakage is detected timely and accurately when monitoring devices are turned on according to recommended monitoring sites contained in the map of sample recommended monitoring site, and in response to determining that the gas leakage is detected, the label is 1, otherwise, the label is 0.

One or more embodiments of the present disclosure provide an Internet of Things (IoT) system for gas monitoring and assessment, wherein the IoT system includes a smart gas user platform, a smart gas service platform, a smart gas safety management platform, a smart gas indoor device sensor network platform, and a smart gas indoor device object platform; the smart gas safety management platform is configured to: obtain industrial gas data of a workshop to be monitored based on the smart gas indoor device object platform and upload the industrial gas data to a smart gas data center through the smart gas indoor device sensor network platform; obtain regional data of the workshop to be monitored based on the smart gas service platform and upload the regional data to the smart gas data center through the smart gas indoor device sensor network platform; determine a key sub-region based on the regional data and the industrial gas data; determine at least one set of diffusion trend data of the key sub-region based on environmental data of the key sub-region; determine at least one recommended monitoring site based on the at least one set of diffusion trend data of the key sub-region, wherein the at least one recommended monitoring site includes at least one mandatory turn-on site and at least one optional turn-on site; send the at least one recommended monitoring site to the smart gas user platform through the smart gas indoor device sensor network platform, and integrate and coordinate an interact between the smart gas user platform and a smart supervision service sub-platform to obtain service for safety supervision; construct a map of recommended monitoring sites based on the at least one recommended monitoring site, the map of recommended monitoring sites being a map that reflects a relationship between various factors in symbolic form based on the at least one recommended monitoring site; and determine a risk value through a risk assessment model based on the map of recommended monitoring sites, wherein the risk assessment model is a graph neural network model, and the risk value is an index configured to judge whether the gas leakage is monitored timely and accurately; wherein the risk assessment model is obtained by training with a training sample and a label separately, the training sample and the label are constructed with historical data of the smart gas data center, the training sample includes at least one map of sample recommended monitoring site constructed based on different sample recommended monitoring site, the label corresponding to the training sample is whether gas leakage is detected timely and accurately when monitoring devices are turned on according to recommended monitoring sites contained in the map of sample recommended monitoring site, and in response to determining that the gas leakage is detected, the label is 1, otherwise, the label is 0.

One or more embodiments of the present disclosure provide a computer-readable non-transitory storage medium storing computer instructions, wherein a computer realizes the method according to claim 1 when reading computer instructions stored in the medium.

In some embodiments of the present disclosure, based on data obtained by an Internet of Things system, the recommended monitoring sites are reasonably and reliably determined for different complex environments, which not only avoids resources waste caused by deploying a large number of monitoring devices, but also ensures timely monitoring of gas leakage, effectively improving the efficiency and accuracy of monitoring of gas leakage safety, and ensuring the safety of gas usage.

DETAILED DESCRIPTION

The drawings that need to be used in the description of the embodiments will be briefly introduced below. The drawings do not represent all embodiments.

The words "a", "an", "one" and/or "the" are not intended to refer to the singular and may include the plural unless the context clearly indicates an exception. In general, the terms "comprise" and "include" imply the inclusion only of clearly identified steps and elements that do not constitute an exclusive listing. A method or device may also include other steps or elements.

It should be understood that in order to facilitate the description of the present disclosure, positional relationship indicated by the terms "center", "upper surface", "lower surface", "upper", "lower", "top", "bottom", "inner", "outer", "axial", "radial", "peripheral", "external" and so on is based on positional relationship shown in the attached drawings, rather than indicating that device, component, or unit must have a specific positional relationship, which is not intended to limit the scope of the present disclosure. However, the words may be replaced by other expressions if other words can achieve the same purpose.

Figure 1:
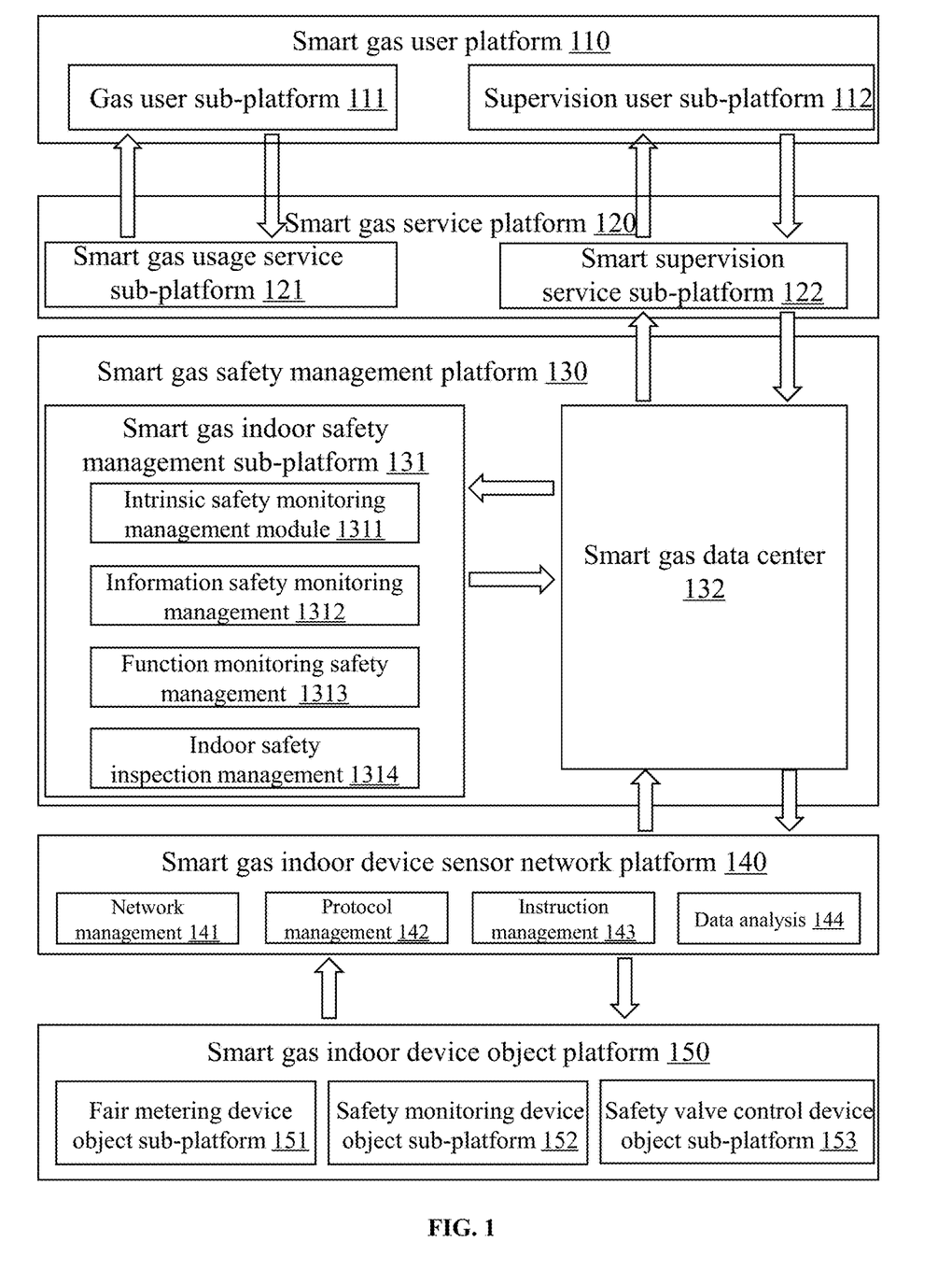
FIG. 1 is a schematic diagram illustrating an exemplary system for monitoring smart gas leakage safety based on an Internet of Things system according to some embodiments of the present disclosure.

FIG. 1 is a schematic diagram illustrating an exemplary system for monitoring smart gas leakage safety based on an Internet of Things system according to some embodiments of the present disclosure. As shown in FIG. 1, the system may include a smart gas user platform 110, a smart gas service platform 120, a smart gas safety management platform 130, a smart gas indoor device sensor network platform 140, and a smart gas indoor device object platform 150 that are connected in sequence.

The smart gas user platform 110 may be a platform for interacting with a user. In some embodiments, the smart gas user platform 110 may be configured as a terminal device.

In some embodiments, the smart gas user platform 110 may include a gas user sub-platform 111 and a supervision user sub-platform 112.

The gas user sub-platform 111 may be a platform that provides a gas user with data related to gas usage and a solution to a gas problem. In some embodiments, the gas user sub-platform 111 may correspond to and interact with a smart gas usage service sub-platform 121 to obtain service for safe gas usage.

The supervision user sub-platform 112 may be a platform for a supervision user to supervise an operation of the entire system. In some embodiments, the supervision user sub-platform 112 may correspond to and interact with a smart supervision service sub-platform 122 to obtain service for safety supervision.

The smart gas service platform 120 may be a platform for communicating the user's need and control information. The smart gas service platform 120 may obtain gas information from the smart gas management platform 130 and send the gas information to the smart gas user platform 110.

In some embodiments, the smart gas service platform 120 may include the smart gas usage service sub-platform 121 and the smart supervision service sub-platform 122.

The smart gas usage service sub-platform 121 may be a platform for providing gas usage service for the gas user.

The smart supervision service sub-platform 122 may be a platform for satisfying a supervision need of a supervision user.

The smart gas management platform 130 may be a platform that integrates and coordinates a connection and collaboration between the functional platforms, gathers all information of an Internet of Things system, and provides functions of perception management and control management for an operating system of the Internet of Things system.

In some embodiments, the smart gas safety management platform 130 may be configured to obtain regional data and industrial gas data of a workshop to be monitored; determine a key sub-region based on the regional data and the industrial gas data; determine at least one recommended monitoring site based on environmental data of the key sub-region.

More information about the regional data, the industrial gas data, the key sub-region, the environmental data, and the recommended monitoring site can be found in FIG. 2, FIG. 3, FIG. 4, FIG. 5, and related descriptions thereof.

In some embodiments, the smart gas management platform 130 may include a smart gas indoor safety management sub-platform 131 and a smart gas data center 132.

The smart gas indoor safety management sub-platform 131 may include an intrinsic safety monitoring management module 1311, an information safety monitoring management module 1312, a function monitoring safety management module 1313, and an indoor safety inspection management module 1314.

In some embodiments, the intrinsic safety monitoring management module 1311 may include monitoring of mechanical leakage, electrical power consumption (e.g., intelligent control power consumption, communication power consumption), valve control, and other gas explosion safety.

In some embodiments, the information safety monitoring management module 1312 may include monitoring of abnormal data, illegal device information, illegal access, or the like.

In some embodiments, the function monitoring management module 1313 may include safety monitoring of functions such as a long-unused function, continuous flow timeout, flow overload, abnormally large flow, abnormally small flow, low air pressure, strong magnetic interference, low voltage, or the like.

In some embodiments, the indoor safety inspection management module 1314 may include managing a safety inspection time warning, safety inspection status, and safety problems of the gas user's indoor device.

The smart gas data center 132 may be configured to store and manage all operation information of a system 100 for monitoring smart gas leakage safety based on an Internet of Things system. In some embodiments, the smart gas data center may be configured as a storage device for storing data related to the monitoring of gas leakage safety or the like.

In some embodiments, the smart gas safety management platform 130 may perform information interaction with the smart gas service platform 120 and the smart gas indoor device sensor network platform 140 through the smart gas data center 132, and the smart gas indoor safety management sub-platform 131 obtains and feeds back safety management data of an indoor device from the smart gas data center 132, and the smart gas data center 132 summarizes and stores all operation data of the system.

In some embodiments, the smart gas indoor device sensor network platform 140 may be a platform for managing perception and communication. In some embodiments, the smart gas indoor device sensing network platform 140 may be configured as a communication network and a gateway.

In some embodiments, the smart gas indoor device sensing network platform 140 may include network management 141, protocol management 142, instruction management 143, and data analysis 144.

The smart gas indoor device object platform 150 may be a platform for generating perception information and executing control information. In some embodiments, the smart gas indoor device object platform 150 may be configured as various types of devices, including an indoor gas device (e.g., a gas meter, a monitoring device, a valve control device) or the like.

In some embodiments, the smart gas indoor device object platform 150 may include a fair metering device object sub-platform 151, a safety monitoring device object sub-platform 152, and a safety valve control device object sub-platform 153, and the smart gas indoor device object platform 150 may obtain gas usage-related information through the object sub-platforms.

In some embodiments of the present disclosure, the system 100 for managing smart gas leakage safety based on an Internet of Things system can form a closed loop of information operation between the smart gas indoor device object platform 150 and the smart gas user platform 110, and coordinates and operates regularly under the smart gas safety management platform 130, so as to realize the informatization and intellectualization of gas safety management.

Figure 2:
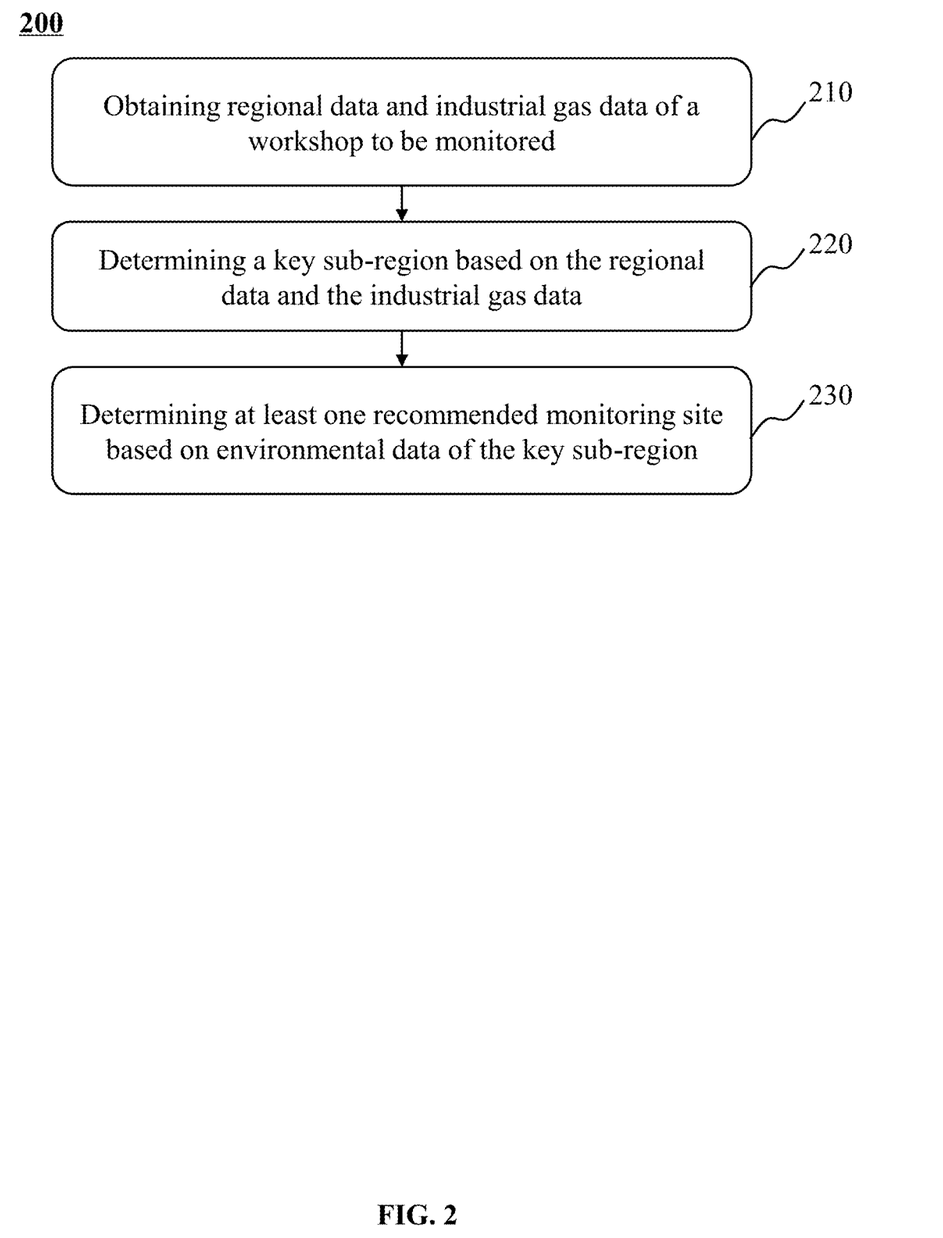
FIG. 2 is a flowchart illustrating an exemplary process for monitoring smart gas leakage based on an Internet of Things system according to some embodiments of the present disclosure.

FIG. 2 is a flowchart illustrating an exemplary process for monitoring smart gas leakage based on an Internet of Things system according to some embodiments of the present disclosure. As shown in FIG. 2, a process 200 includes the following steps. In some embodiments, the process 200 may be executed by a processor in the smart gas safety management platform 130.

step 210, obtaining regional data and industrial gas data of a workshop to be monitored.

The regional data refers to relevant information and data of the workshop to be monitored. The regional data may include a structure, area, floor height, and enclosure of the workshop.

The industrial gas data refers to gas-related data of the workshop to be monitored. The industrial gas data may include a distribution situation of gas pipelines and gas devices in the workshop, a density of the gas pipelines, a frequency and duration of usage of the gas devices, or the like.

In some embodiments, a smart gas indoor device object platform 150 may obtain the industrial gas data, and upload the industrial gas data to a smart gas data center 132 through a smart gas indoor device sensor network platform 140, and the processor may obtain the industrial gas data from the smart gas data center 132. More information about the smart gas indoor device object platform 150, the smart gas indoor device sensor network platform 140, and the smart gas data center 132 can be found in FIG. 1 and related descriptions thereof.

step 220, determining a key sub-region based on the regional data and the industrial gas data.

The key sub-region refers to a region where a monitoring device needs to be installed or changed in the workshop to be monitored.

In some embodiments, the processor may determine the key sub-region based on a preset rule, the regional data, and the industrial gas data. For example, the processor may determine a region in the workshop where the region is smaller than a regional threshold with a relatively airtight space, a dense distribution of gas pipelines, and frequently long-used gas devices as the key sub-region.

In some embodiments, the processor may determine the key sub-region through the following steps S11 to S13.

step S11, determining a plurality of grid regions by performing grid processing on the workshop to be monitored based on the regional data and the industrial gas data.

The grid processing refers to a process of dividing a three-dimensional spatial area of the entire workshop into a limited number of sub-space regions with an equal volume.

In some embodiments, after the grid processing is performed on the workshop to be monitored, grid regions that do not contain any gas-related facilities (e.g., a gas pipeline, a gas device) may be eliminated.

step S12, obtaining environmental data of at least one grid region among the plurality of grid regions.

The environmental data refers to relevant data of an environment in a grid region. The environmental data may include a wind direction condition such as a wind direction change, air velocity, temperature, humidity, or the like.

step S13, determining the key sub-region based on the environmental data of the at least one grid region.

In some embodiments, the processor may determine the key sub-region by querying a table based on the environmental data of the at least one grid region. For example, the processor may obtain environmental data corresponding to historical key sub-regions and construct a table based on the environmental data, and if environmental data of a grid region is the same as the environmental data in the table, the grid region is determined as the key sub-region.

In some embodiments, the processor may determine a range of key sub-region through a key sub-region prediction model based on the environmental data of the at least one grid region. More information about the key sub-region prediction model can be found in FIG. 3 and related descriptions thereof.

The range of key sub-region refers to a coordinate range of key sub-regions in the workshop.

In some embodiments, the processor may determine the key sub-region based on the range of key sub-region. For example, the processor may determine a grid region that falls within the range of key sub-region as the key sub-region.

In some embodiments of the present disclosure, performing the grid processing on the workshop to determine the key sub-region can preliminarily screen out invalid grid regions, reduce a volume of data to be processed, and improve the work efficiency of the platform; moreover, determining the key sub-region based on the environmental data can fully consider an impact of external environmental factors on a monitoring result of gas leakage safety, and improve the accuracy of a determined key sub-region.

step 230: determining at least one recommended monitoring site based on environmental data of the key sub-region.

The recommended monitoring site refers to a recommended location or a range of locations for installing a gas monitoring device.

In some embodiments, the processor may determine the at least one recommended monitoring site by comparing and analyzing current environmental data of the key sub-region with historical data. For example, the processor may obtain historical environmental data and historical locations of monitoring sites of a same key sub-region, and determine a historical location of a monitoring site whose corresponding historical environmental data is as same as the current environmental data as a location of the recommended monitoring site.

In some embodiments, the processor may determine the at least one recommended monitoring site through the following steps S21 and S22.

step S21, determining at least one set of diffusion trend data of the key sub-region based on the environmental data of the key sub-region.

The diffusion trend data may include a diffusion speed of gas in various directions.

In some embodiments, after the processor performs the grid processing on the workshop to be monitored, a coordinate system is formed based on the workshop to be monitored, and the diffusion trend data may include the diffusion speed on three directions of x-axis, y-axis, and z-axis of the coordinate system.

In some embodiments, gas path data of a plurality of consecutive grid regions may constitute diffusion trend data of gas. For example, path data of gas flowing from one grid region to a next grid region may constitute the diffusion trend data of gas.

In some embodiments, the processor may predict the at least one set of diffusion trend data of the key sub-region through a diffusion model based on the environmental data of the key sub-region.

Figure 4:
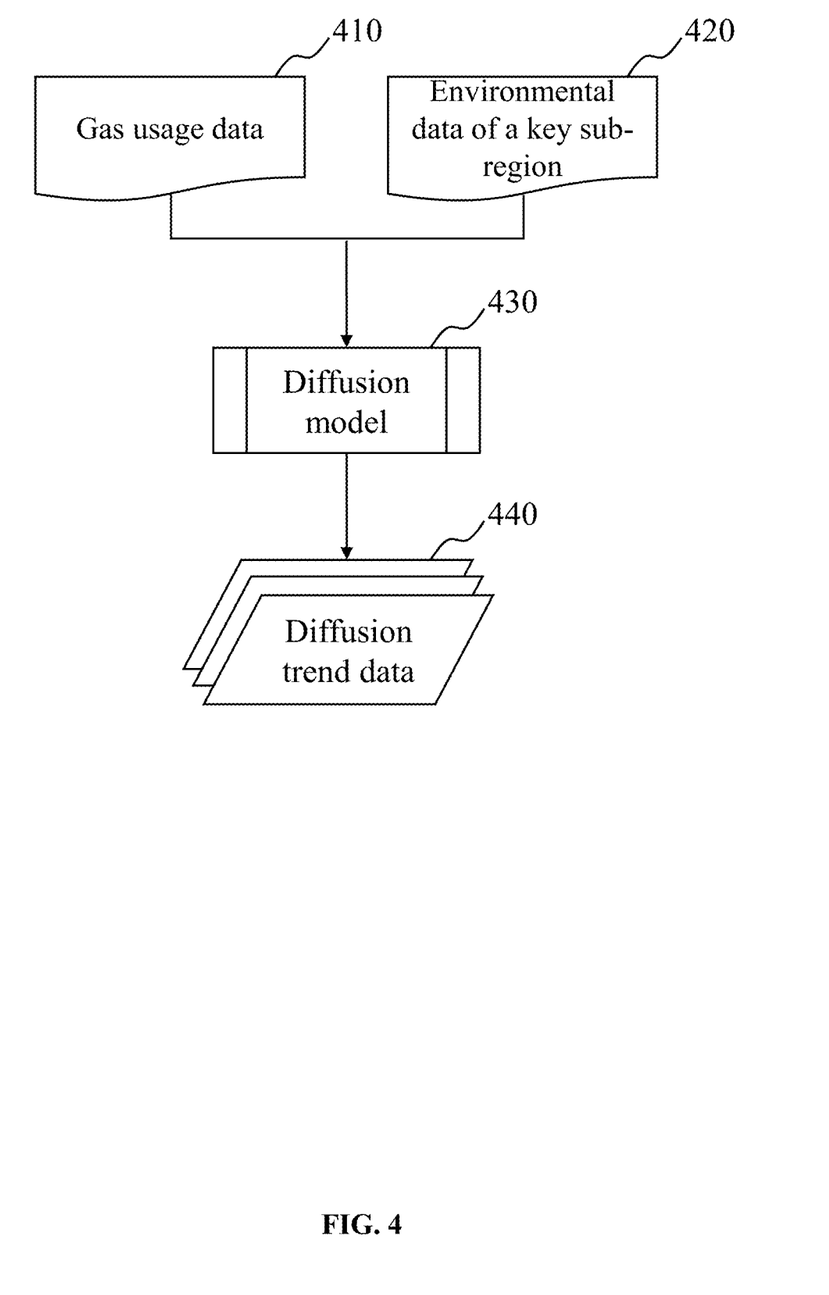
FIG. 4 is a schematic diagram illustrating an exemplary diffusion model according to some embodiments of the present disclosure.

More information about the diffusion model can be found in FIG. 4 and related descriptions thereof.

In some embodiments, the at least one set of diffusion trend data is also related to an opening and closing situation of doors and windows in the workshop to be monitored. For example, when the doors and windows are open, due to an influence of airflow, the diffusion speed of gas in a certain direction is accelerated in the diffusion trend data.

In some embodiments, a relationship between the opening and closing situation of doors and windows in the workshop to be monitored may be represented by a Boolean value. If the doors and windows are open, the Boolean value is 1, and if the doors and windows are closed, the Boolean value is 0.

In some embodiments of the present disclosure, further considering the opening and closing situation of doors and windows when determining the diffusion trend data can avoid a misjudgment of gas leakage caused by changes in the diffusion trend data for opening doors and windows.

step S22: determining the at least one recommended monitoring site based on the at least one set of diffusion trend data of the key sub-region.

In some embodiments, if a gas leakage occurs at a certain location, leaked gas may gather at this location due to the lack of air circulation. Therefore, the processor may determine a location corresponding to a set of diffusion trend data in which the diffusion speed of gas in all directions is relatively small (e.g., smaller than a speed threshold) as the recommended monitoring site based on at the least one set of diffusion trend data of the key sub-region.

In some embodiments, the processor may determine an upstream location of gas diffusion as the recommended monitoring site based on a diffusion direction in the diffusion trend data. For example, in the diffusion trend data, if the diffusion direction is from a location A to a location B, then the location A is the upstream location, and the processor may determine the location A as the recommended monitoring site.

In some embodiments, at least one monitoring device for gas leakage is located on a combined slide, and the at least one monitoring device moves on the combined slide. In some embodiments, after the processor performs the grid processing on the workshop to be monitored, the coordinate system is formed based on the workshop to be monitored, and the combined slide may include a plurality of sets of combined slides on the directions of x-axis, y-axis, and z-axis, so that the monitoring device may slide in different dimensional directions.

In some embodiments, the processor may determine an adaptive location of at least one monitoring device on the at least one recommended monitoring site based on the environmental data, the at least one set of diffusion trend data, and gas usage data of the key sub-region continuously. For example, the processor may adjust a height of the monitoring device according to a wind force and wind direction in different seasons, a direction of airflow in the key sub-region, and a density change of gas used in the workshop to be monitored.

The gas usage data refers to relevant information and data of gas used by the workshop to be monitored. The gas usage data may include a type, density, flow rate, etc. of gas used.

In some embodiments, the processor may continuously process the gas usage data and the environmental data of the key sub-region through the diffusion model, predict the at least one set of diffusion trend data of the key sub-region, and determine at least one new recommended monitoring site based on the diffusion trend data, and adaptively adjust the monitoring device to the new recommended monitoring site.

More information about the diffusion model can be found in FIG. 4 and related descriptions thereof. More details on determining the recommended monitoring site based on the diffusion trend data can be found in step S22.

In some embodiments of the present disclosure, according to real-time environmental data and real-time diffusion trend data of the key sub-region, a location of the recommended monitoring site is continuously adjusted, and the monitoring device is automatically moved, so that the monitoring device can flexibly change the monitoring location according to an actual situation, henceforth improving a utilization rate of resources and ensuring a timely monitoring of sites where a gas leakage may occur.

In some embodiments, the recommended monitoring site may include at least one mandatory turn-on site and at least one optional turn-on site.

The mandatory turn-on site refers to a location where the monitoring device must be installed and turned on. The optional turn-on site refers to a location where the monitoring device is turned on demand according to an actual need.

In some embodiments, an actual requirement for determining whether a monitoring device at the optional turn-on site is turned on or not may include an actual situation of production and gas usage of a workshop.

In some embodiments, a location of the optional turn-on site is relative to a location of the mandatory turn-on site. For example, if there are many optional turn-on sites in a certain region, one mandatory turn-on point may be appropriately set.

In some embodiments of the present disclosure, by setting the mandatory turn-on site and the optional turn-on site, the monitoring device is turned on for a long time for a location with a higher demand while turned on as needed according to an actual situation for a location with a lower demand. This can ensure that no locations where gas leakage may occur may be missed while reducing monitoring costs and a volume of data processed by the platform; moreover, the optional turn-on site can assist the mandatory turn-on site to monitor whether the gas leakage occurs, which further improves the accuracy of a monitoring result of the gas leakage safety and effectively guarantees the safety of gas usage.

In some embodiments, the processor may evaluate a risk value of a set of turn-on sites.

The set of turn-on sites refers to a set formed by locations of monitoring devices that have been turned on at the recommended monitoring site.

The risk value refers to an index to judge whether the gas leakage can be monitored timely and accurately. The smaller the risk value, the timelier and more accurate the monitoring of the gas leakage.

In some embodiments, different sets of turn-on sites correspond to different risk values. For example, there are three optional turn-on sites A, B, and C. When only turning on a monitoring device at A, a corresponding risk value may be 90%, when turning on monitoring devices at A and B, a corresponding risk value may be 50%, when turning on monitoring devices at B and C, a corresponding risk value may be 40%.

In some embodiments, the processor may determine turn-on sites included in a set of turn-on sites whose risk value satisfies a risk condition as the mandatory turn-on sites, and determine monitoring sites other than the mandatory turn-on sites among the recommended monitoring site as the optional turn-on sites.

In some embodiments, the risk condition may be determined based on a priori experience. For example, the risk condition may be that the risk value is less than a risk threshold (e.g., 50%).

In some embodiments, on the premise that the risk value satisfies the risk condition, the optional turn-on site is also related to other factors. For example, the optional turn-on site is also related to economic benefits. Under the premise that the risk value satisfies the risk condition, the fewer the count of optional turn-on sites, the lower the production cost.

In some embodiments, the processor may construct a map of recommended monitoring site based on the at least one recommended monitoring site; determine the risk value of the set of turn-on sites through a risk assessment model based on the map of recommended monitoring site.

Figure 5:
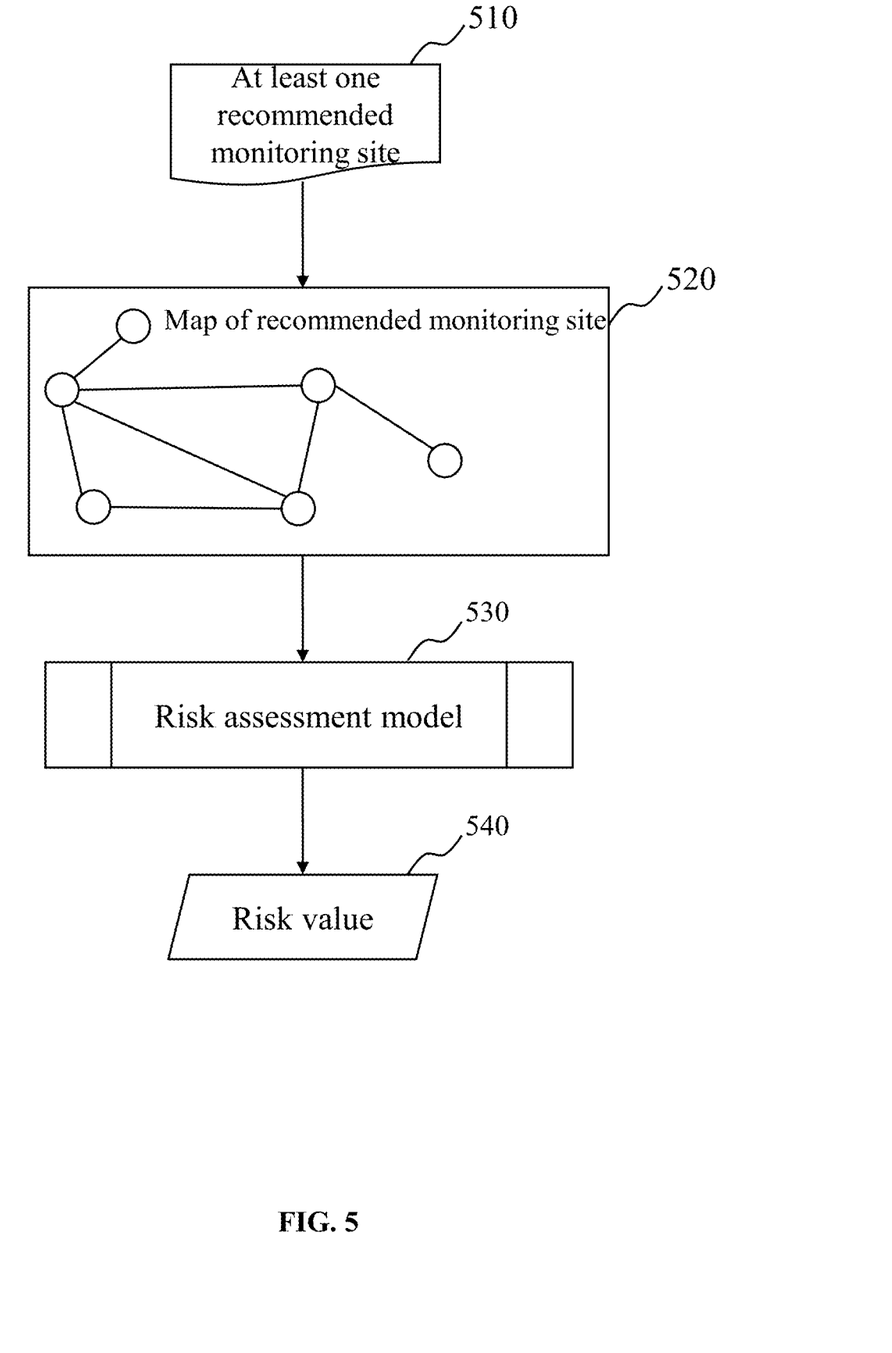
FIG. 5 is a schematic diagram illustrating an exemplary map of recommended monitoring sites and a risk assessment model according to some embodiments of the present disclosure.

More information on the map of recommended monitoring site and the risk assessment model can be found in FIG. 5 and related descriptions thereof.

In some embodiments, the processor may determine a monitoring device that needs to be turned on at the at least one optional turn-on site based on the risk value. For example, when the risk value falls to satisfy the risk condition, the processor may determine the monitoring device that needs to be turned on at the at least one optional turn-on site based on a turn-on situation of monitoring devices at the optional turn-on site corresponding to the risk value.

In some embodiments of the present disclosure, determining the monitoring device that needs to be turned on at the optional turn-on site based on the risk value can accurately determine a monitoring device that needs to be opened, which can not only ensure timely and comprehensive monitoring of the gas leakage but also avoid resources waste.

It should be noted that the above description about the process 200 is only for illustration and description, and does not limit the scope of application of the present disclosure herein. For those skilled in the art, various modifications and changes may be made to the process 200 under the guidance of the present disclosure. However, such modifications and changes are still within the scope of the present disclosure.

Figure 3:
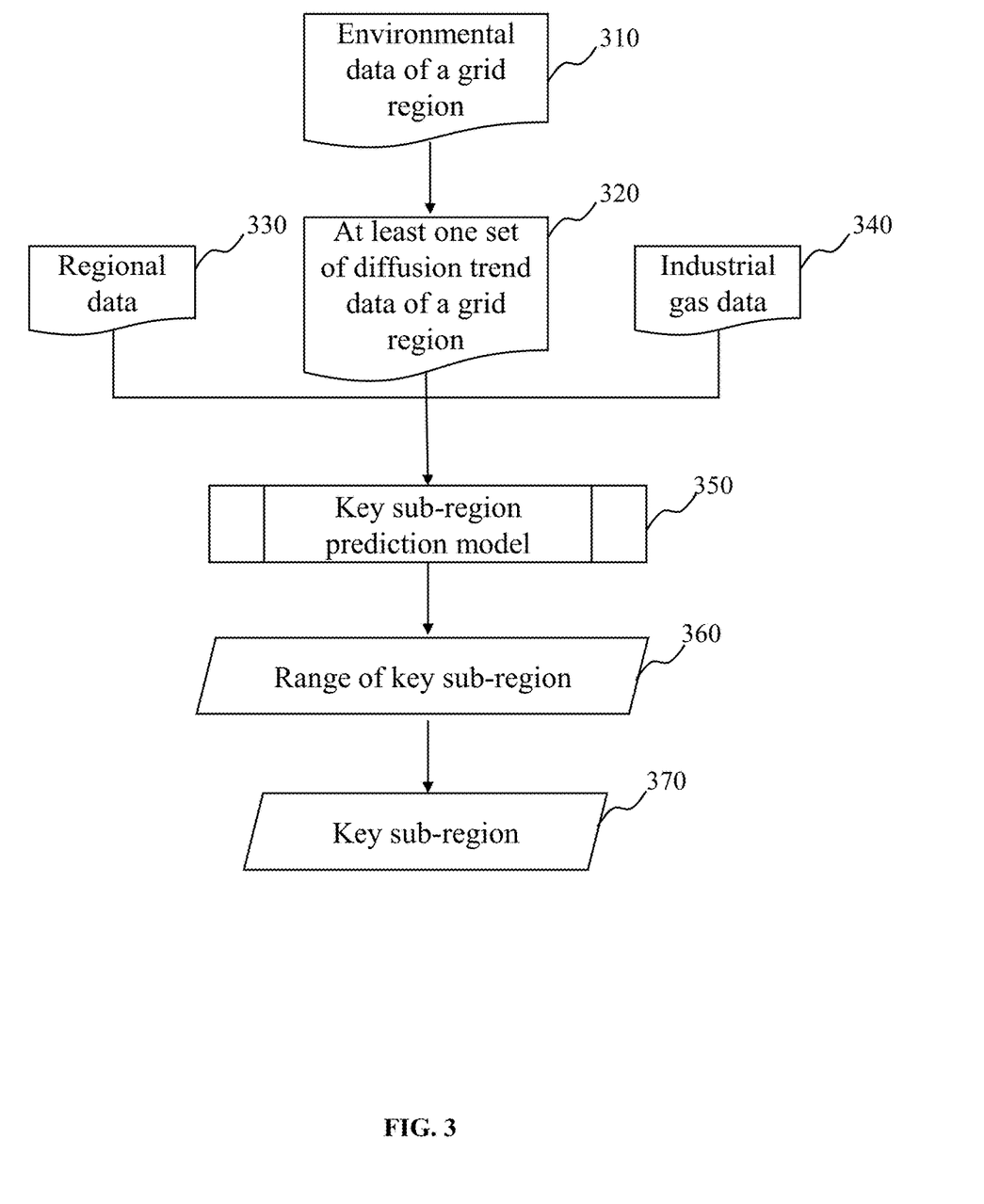
FIG. 3 is a schematic diagram illustrating an exemplary key sub-region prediction model according to some embodiments of the present disclosure.

FIG. 3 is a schematic diagram illustrating an exemplary key sub-region prediction model according to some embodiments of the present disclosure.

In some embodiments, as shown in FIG. 5, a processor may determine at least one set of diffusion trend data 320 of a grid region based on environmental data 310 of the grid region.

A manner of determining the at least one set of diffusion trend data of the at least one grid region based on the environmental data of the at least one grid region is the same as a manner of determining at least one set of diffusion trend data of a key sub-region based on environmental data of the key sub-region. More information about the environmental data, the diffusion trend data, and determining the diffusion trend data based on the environmental data can be found in FIG. 2, FIG. 4, and related descriptions thereof.

In some embodiments, the processor may determine a range of key sub-region based on the at least one set of diffusion trend data, regional data, and industrial gas data of the at least one grid region through a key sub-region prediction model. More information about the regional data and the industrial gas data can be found in FIG. 2 and related descriptions thereof.

The key sub-region prediction model refers to a model configured to determine the key sub-region. In some embodiments, the key sub-region prediction model may be a machine learning model, such as a neural network (NN) model or the like. In some embodiments, the key sub-region prediction model may be other machine learning models or a combination thereof.

In some embodiments, an input of a key sub-region prediction model 350 may include the at least one set of diffusion trend data 320, regional data 330, and industrial gas data 340 of the grid region, and an output may include a range of key sub-region 360.

In some embodiments, the processor may determine a key sub-region 370 based on the range of key sub-region 360. More information about the range of key sub-region and the key sub-region can be found in FIG. 2 and related descriptions thereof.

In some embodiments, the key sub-region prediction model may be obtained by training historical data separately. In some embodiments, a first training sample for training the key sub-region prediction model may include at least one set of diffusion trend data, regional data, and industrial gas data of a plurality of sample grid regions; a first label corresponding to the first training sample is whether a sample grid region is the key sub-region. If the sample grid region is the key sub-region (i.e., it is necessary to install or change a monitoring device), the first label is 1, otherwise, it is 0.

In some embodiments of the present disclosure, after grid processing is performed on a workshop, for each grid, determining the diffusion trend data based on the environmental data can fully take into account an influence of different environmental factors on gas diffusion; moreover, by processing the diffusion trend data, the regional data, and the industrial gas data through the key sub-region prediction model to determine the key sub-region, efficiency and accuracy of predicting the key sub-region can be improved.

FIG. 4 is a schematic diagram illustrating an exemplary diffusion model according to some embodiments of the present disclosure;

In some embodiments, the processor may process environmental data of a key sub-region through a diffusion model to predict at least one set of diffusion trend data of the key sub-region.

More information about the key sub-region, the environmental data, and the diffusion trend data can be found in FIG. 2 and related descriptions thereof.

The diffusion model refers to a model configured to predict the at least one set of diffusion trend data of the key sub-region. In some embodiments, the diffusion model may be a machine learning model, such as a neural network (NN) model or the like. In some embodiments, the diffusion model may be other machine learning models or a combination thereof.

In some embodiments, an input of a diffusion model 430 may at least include gas usage data 410 and environmental data 420 of the key sub-region, and an output may include at least one set of diffusion trend data 440 of the key sub-region. In some embodiments, the at least one set of diffusion trend data 440 output of the key sub-region includes a gas diffusion speed in directions of x-axis, y-axis, and z-axis.

In some embodiments, the input of the diffusion model 430 may also include an opening and closing situation of doors and windows in a workshop to be monitored.

More information about the gas usage data and the opening and closing situation of doors and windows in the workshop to be monitored can be found in FIG. 2 and related descriptions thereof.

In some embodiments, the diffusion model may be obtained by training historical data separately. In some embodiments, a second training sample for training the diffusion model may include environmental data and sample gas usage data of a plurality of sample key sub-regions; a second label corresponding to the second training sample is actual diffusion trend data of the sample key sub-region.

In some embodiments of the present disclosure, predicting the at least one set of diffusion trend data of the key sub-region by the diffusion model based on the gas usage data and the environmental data of the key sub-region, and further using the opening and closing situation of doors and windows in the workshop to be monitored as an input of the diffusion model can improve the accuracy of determining the diffusion trend data.

FIG. 5 is a schematic diagram illustrating an exemplary map of recommended monitoring sites and a risk assessment model according to some embodiments of the present disclosure.

In some embodiments, as shown in FIG. 5, a processor may construct a map of recommended monitoring site 520 based on at least one recommended monitoring site 510.

The map of recommended monitoring site refers to a map that reflects a relationship between various factors in symbolic form based on the recommended monitoring site. The map of recommended monitoring site includes nodes and edges.

In some embodiments, the processor may randomly select a limited number of recommended monitoring sites from the recommended monitoring sites to form the map of recommended monitoring site.

A node refers to a recommended monitoring site, and attributes of the node include a height of a recommended monitoring site corresponding to the node and industrial gas-related data. The height refers to a rising distance of the recommended monitoring site in a vertical direction based on the ground of a workshop to be monitored. The industrial gas-related data refers to a situation of distribution and usage of gas pipelines and gas devices near the recommended monitoring site (e.g., a distance from the recommended monitoring site is less than a distance threshold).

An edge is configured to connect the nodes. In some embodiments, if a distance between recommended monitoring sites corresponding to two nodes is less than the distance threshold, the two nodes are connected by an edge. In some embodiments, an edge between connecting nodes is a directed edge, and a direction of the edge is a diffusion direction of gas.

Attributes of the edge include a distance between recommended monitoring sites corresponding to nodes and the diffusion direction of gas.

In some embodiments, the processor may process the map of recommended monitoring site through a risk assessment model to determine a risk value.

The risk assessment model refers to a model configured to determine a risk value of a set of turn-on sites. In some embodiments, the risk assessment model may be a Graph Neural Networks (GNN) model. In some embodiments, the risk assessment model may be other machine learning models or a combination thereof.

In some embodiments, an input of a risk assessment model 530 may include a map of recommended monitoring site 520. In some embodiments, when the map of recommended monitoring site 520 is input into the risk assessment model 530, recommended monitoring sites contained in the map of recommended monitoring site 520 are all regarded as turn-on sites. In some embodiments, an output of the risk assessment model 530 may include a risk value 540 of a set of turn-on sites included in the map of recommended monitoring site 520. More information about the risk value can be found in FIG. 2 and related descriptions thereof.

In some embodiments, the risk assessment model may be obtained by training historical data separately. In some embodiments, a third training sample for training the risk assessment model may include at least one map of sample recommended monitoring site constructed based on different sample recommended monitoring sites; a third label corresponding to the third training sample is whether gas leakage can be detected timely and accurately when monitoring devices are turned on according to recommended monitoring sites contained in the map of sample recommended monitoring site. If the gas leakage can be detected, the label is 1, otherwise, it is 0.

In some embodiments of the present disclosure, constructing a map of recommended monitoring site based on the recommended monitoring sites can fully take into account a relationship between different recommended monitoring sites; Moreover, processing the map of recommended monitoring site based on the risk assessment model can predict the risk value more accurately and rationally.

One or more embodiments of the present disclosure provide a computer-readable non-transitory storage medium storing computer instructions, and when a computer reads the computer instructions in the storage medium, the computer executes the method for monitoring smart gas leakage safety based on an Internet of Things system described in any one of the above-mentioned embodiments.

When the operations performed are described step by step in the embodiments of the present disclosure, unless otherwise specified, the order of the steps can be changed, the steps can be omitted, and other steps can also be included in the operation process.

The embodiments in the present disclosure are only for illustration and description, and do not limit the scope of application of the present disclosure. For those skilled in the art, various modifications and changes can be made under the guidance of the present disclosure and the various modifications and changes are still within the scope of the present disclosure.

Certain features, structures, or characteristics in one or more embodiments of the present disclosure may be properly combined.

In some embodiments, the numbers expressing quantities, properties, and so forth, used to describe and claim certain embodiments of the application are to be understood as being modified in some instances by the term "about", "approximate", or "substantially". Unless otherwise stated, the "about", "approximate", or "substantially" indicates that the stated figure allows for a variation of ±20%. Accordingly, in some embodiments, the numerical parameters and claims used in the present disclosure are approximations that can vary depending on the desired characteristics of individual embodiments. Although the numerical ranges and parameters used in some embodiments of the present disclosure to confirm the breadth of the range are approximations, in specific embodiments, such numerical values may be set as precisely as practicable.

If there is any inconsistency or conflict between the descriptions, definitions, and/or use of terms in the cited materials in the present disclosure and the contents of the present disclosure, the descriptions, definitions, and/or use of terms in the present disclosure shall prevail.

What is claimed is:

1. A method for gas monitoring and assessment based on Internet of Things, wherein the method is executed by a processor in a smart gas safety management platform of a system for gas monitoring and assessment based on Internet of Things, and the method comprises:

obtaining industrial gas data of a workshop to be monitored based on a smart gas indoor device object platform and uploading the industrial gas data to a smart gas data center through a smart gas indoor device sensor network platform;

obtaining regional data of the workshop to be monitored based on a smart gas service platform and uploading the regional data to the smart gas data center through the smart gas indoor device sensor network platform;

determining a key sub-region based on the regional data and the industrial gas data;

determining at least one set of diffusion trend data of the key sub-region based on environmental data of the key sub-region;

determining at least one recommended monitoring site based on the at least one set of diffusion trend data of the key sub-region, wherein the at least one recommended monitoring site includes at least one mandatory turn-on site and at least one optional turn-on site;

sending the at least one recommended monitoring site to a smart gas user platform through the smart gas indoor device sensor network platform, and integrating and coordinating an interaction between the smart gas user platform and a smart supervision service sub-platform to obtain service for safety supervision;

constructing a map of recommended monitoring sites based on the at least one recommended monitoring site, the map of recommended monitoring sites being a map that reflects a relationship between various factors in symbolic form based on the at least one recommended monitoring site; wherein the map of recommended monitoring sites includes nodes and edges; the nodes refer to the recommended monitoring sites, and attributes of the node include a height of a recommended monitoring site corresponding to the node and industrial gas-related data, the height refers to a rising distance of the recommended monitoring site in a vertical direction based on a ground of the workshop to be monitored, the industrial gas-related data refers to a situation of distribution and usage of gas pipelines and gas devices near the recommended monitoring site; the edges are used to connect the nodes, in response to that a distance between recommended monitoring sites corresponding to two nodes is less than a distance threshold, the two nodes are connected by an edge; the edge connecting nodes is a directed edge, and a direction of the edge is a diffusion direction of gas, attributes of the edge include the distance between recommended monitoring sites corresponding to the nodes and the diffusion direction of gas; and determining a risk value through a risk assessment model based on the map of recommended monitoring sites, wherein the risk assessment model is a graph neural network model, and the risk value is an index used to judge whether the gas leakage is monitored timely and accurately; wherein the recommended monitoring sites contained in the map of recommended monitoring sites are all regarded as turn-on sites, an input of the risk assessment model includes the map of recommended monitoring sites, an output of the risk assessment model includes the risk value of a set of the turn-on sites included in the map of recommended monitoring sites; the smaller the risk value, the timelier and more accurate monitoring of the gas leakage; wherein
the risk assessment model is obtained by training with a training sample and a label separately, the training sample and the label are constructed with historical data of the smart gas data center,
the training sample includes at least one map of sample recommended monitoring site constructed based on different sample recommended monitoring sites, the label corresponding to the training sample is whether gas leakage is detected timely and accurately when monitoring devices are turned on according to recommended monitoring sites contained in the map of sample recommended monitoring site, and in response to determining that the gas leakage is detected, the label is 1, otherwise, the label is 0.

2. The method according to claim 1, wherein the determining a key sub-region based on the regional data and the industrial gas data includes:
determining a plurality of grid regions by performing grid processing on the workshop to be monitored based on the regional data and the industrial gas data;
obtaining environmental data of at least one grid region among the plurality of grid regions based on the smart gas indoor device object platform, and uploading the environmental data of the at least one grid region to the smart gas data center through the smart gas indoor device sensor network platform; and
determining the key sub-region based on the environmental data of the at least one grid region.

3. The method according to claim 2, wherein the determining the key sub-region based on the environmental data of the at least one grid region includes:
determining a range of key sub-region through a key sub-region prediction model based on the environmental data of the at least one grid region, and the key sub-region prediction model is a machine learning model, wherein the range of key sub-region refers to a coordinate range of key sub-regions in the workshop to be monitored; and
determining the key sub-region based on the range of key sub-region.

4. The method according to claim 3, wherein the determining a range of key sub-region through a key sub-region prediction model based on the environmental data of the at least one grid region includes:
determining at least one set of diffusion trend data of the at least one grid region based on the environmental data of the at least one grid region; and
determining the range of key sub-region through the key sub-region prediction model based on the at least one set of diffusion trend data, the regional data, and the industrial gas data of the at least one grid region.

5. The method according to claim 1, wherein at least one monitoring device for monitoring gas leakage is located on a combined slide, and the at least one monitoring device moves on the combined slide;
the method further includes:
determining an adaptive location of the at least one monitoring device at the at least one recommended monitoring site based on the environmental data of the key sub-region, the at least one set of diffusion trend data, and gas usage data.

6. The method according to claim 1, wherein the determining at least one set of diffusion trend data of the key sub-region based on the environmental data of the key sub-region includes:
predicting at least one set of diffusion trend data of the key sub-region through a diffusion model based on the environmental data of the key sub-region, wherein the diffusion model is a machine learning model.

7. The method according to claim 1, wherein the at least one set of diffusion trend data is related to an opening and closing situation of doors and windows in the workshop to be monitored.

8. The method according to claim 1, further comprising:
determining a monitoring device to be turned on of the at least one optional turn-on site based on the risk value.

9. A computer-readable non-transitory storage medium storing computer instructions, wherein a computer realizes the method according to claim 1 when the computer instructions are executed by the processor.

10. A system for gas monitoring and assessment based on Internet of Things, wherein the IoT system includes a smart gas user platform, a smart gas service platform, a smart gas safety management platform, a smart gas indoor device sensor network platform, and a smart gas indoor device object platform;
the smart gas safety management platform is configured to:
obtain industrial gas data of a workshop to be monitored based on the smart gas indoor device object platform and upload the industrial gas data to a smart gas data center through the smart gas indoor device sensor network platform;
obtain regional data of the workshop to be monitored based on the smart gas service platform and upload the regional data to the smart gas data center through the smart gas indoor device sensor network platform;
determine a key sub-region based on the regional data and the industrial gas data;
determine at least one set of diffusion trend data of the key sub-region based on environmental data of the key sub-region;
determine at least one recommended monitoring site based on the at least one set of diffusion trend data of the key sub-region, wherein the at least one recommended monitoring site includes at least one mandatory turn-on site and at least one optional turn-on site;
send the at least one recommended monitoring site to the smart gas user platform through the smart gas indoor device sensor network platform, and integrate and coordinate an interact between the smart gas user platform and a smart supervision service sub-platform to obtain service for safety supervision;
construct a map of recommended monitoring sites based on the at least one recommended monitoring site, the map of recommended monitoring sites being a map that reflects a relationship between various factors in symbolic form based on the at least one recommended monitoring site; wherein the map of recommended monitoring sites includes nodes and edges; the nodes refer to the recommended monitoring sites, and attributes of the node include a height of a recommended monitoring site corresponding to the node and industrial gas-related data, the height refers to a rising distance of the recommended monitoring site in a vertical direction based on a ground of the workshop to be monitored, the industrial gas-related data refers to a situation of distribution and usage of gas pipelines and gas devices near the recommended monitoring site; the edges are used to connect the nodes, in response to that a distance between recommended monitoring sites corresponding to two nodes is less than a distance threshold, the two nodes are connected by an edge; the edge connecting nodes is a directed edge, and a direction of the edge is a diffusion direction of gas, attributes of the edge include the distance between recommended monitoring sites corresponding to the nodes and the diffusion direction of gas; and determine a risk value through a risk assessment model based on the map of recommended monitoring sites, wherein the risk assessment model is a graph neural network model, and the risk value is an index used to judge whether the gas leakage is monitored timely and accurately; wherein the recommended monitoring sites contained in the map of recommended monitoring sites are all regarded as turn-on sites, an input of the risk assessment model includes the map of recommended monitoring sites, an output of the risk assessment model includes the risk value of a set of the turn-on sites included in the map of recommended monitoring sites; the smaller the risk value, the timelier and more accurate monitoring of the gas leakage; wherein the risk assessment model is obtained by training with a training sample and a label separately, the training sample and the label are constructed with historical data of the smart gas data center, the training sample includes at least one map of sample recommended monitoring site constructed based on different sample recommended monitoring site, the label corresponding to the training sample is whether gas leakage is detected timely and accurately when monitoring devices are turned on according to recommended monitoring sites contained in the map of sample recommended monitoring site, and in response to determining that the gas leakage is detected, the label is 1, otherwise, the label is 0.

11. The system according to claim 10, wherein the smart gas safety management platform is further configured to:

determine a plurality of grid regions by performing grid processing on the workshop to be monitored based on the regional data and the industrial gas data;

obtain environmental data of at least one grid region among the plurality of grid regions based on the smart gas indoor device object platform, and upload the environmental data of the at least one grid region to the smart gas data center through the smart gas indoor device sensor network platform; and determine the key sub-region based on the environmental data of the at least one grid region.

12. The system according to claim 10, wherein the smart gas safety management platform is further configured to:

determine a range of key sub-region through a key sub-region prediction model based on the environmental data of the at least one grid region, and the key sub-region prediction model is a machine learning model, wherein the range of key sub-region refers to a coordinate range of key sub-regions in the workshop to be monitored; and determine the key sub-region based on the range of key sub-region.

13. The system according to claim 10, wherein the smart gas safety management platform is further configured to:

determine at least one set of diffusion trend data of the at least one grid region based on the environmental data of the at least one grid region; and determine the range of key sub-region through the key sub-region prediction model based on the at least one set of diffusion trend data, the regional data, and industrial gas data of the at least one grid region.

14. The system according to claim 10, wherein at least one monitoring device for monitoring gas leakage is located on a combined slide, and the at least one monitoring device moves on the combined slide;

the smart gas safety management platform is further configured to:

determine an adaptive location of the at least one monitoring device at the at least one recommended monitoring site based on the environmental data of the key sub-region, the at least one set of diffusion trend data, and gas usage data.

15. The system according to claim 10, wherein the determining at least one set of diffusion trend data of the key sub-region based on the environmental data of the key sub-region includes:

predicting at least one set of diffusion trend data of the key sub-region through a diffusion model based on the environmental data of the key sub-region, wherein the diffusion model is a machine learning model.

16. The system according to claim 10, wherein the at least one set of diffusion trend data is related to an opening and closing situation of doors and windows in the workshop to be monitored.

17. The system according to claim 9, wherein the smart gas safety management platform is further configured to:

determine a monitoring device to be turned on of the at least one optional turn-on site based on the risk value.

* * * * *